Patented June 14, 1949

2,472,912

UNITED STATES PATENT OFFICE 2,472,912

METHOD OF DRYING ALCOHOLS

William S. W. McCarter, Bala-Cynwyd, Pa., assignor to Attapulgus Clay Company, Philadelphia, Pa., a corporation of Delaware No Drawing. Application December 22, 1945, Serial No. 637,109

6 Claims. (Cl. 210—42.5)

The present invention relates to the drying of alcohols, and more particularly to the production of anhydrous and absolute alcohols from alcohol containing water. The method of this invention is especially adapted to the drying of ethyl alcohol, although other lower aliphatic alcohols such as methyl, propyl, isopropyl, and the butyl alcohols may be satisfactorily treated.

It has been proposed heretofore to produce anhydrous alcohol by vaporizing ethyl alcohol containing water and contacting the vapors with activated alumina. However, this process has the disadvantage of producing undesirably large quantities of ethylene, and although this may be remedied to a certain extent by a preliminary wetting of the alumina with liquid alcohol, considerable quantities of ethylene are still produced at the elevated temperature necessary for vapor phase operation.

I have found that the above difficulties may be obviated by effecting drying of alcohol in the liquid phase and at relatively low temperatures preferably below 100° F. In accordance with this invention, I bring the alcohol containing water into intimate contact with a thermally activated argillaceous adsorbent such as bauxite, fuller's earth, acid activated bentonite, or the like at a temperature preferably below 100° F. and at a relatively low space velocity. Substantial drying is accomplished at space velocities between 0.1 and 0.2 volumes of alcohol per volume of adsorbent per hour, but in general no absolute alcohol is produced. However, at space velocities below about 0.1, a substantial yield of absolute alcohol is obtained, with negligible production of olefin gas. Argillaceous adsorbents having a particle size of 4–8 mesh, 10–30 mesh, 10–60 mesh, or finer may be used, although 10–30 or 30–60 mesh is particularly desirable when operating with the percolation technique. In general, the adsorbent should be thermally activated prior to use by heating or calcining at temperatures between 400° F. and 1200° F. Granular bauxite activated between 600° F. and 1200° F., or fuller's earth activated at 450° F. to 900° F. are particularly efficacious. Acid activated bentonite, one variety of which is marketed under the name "Filtrol," is also satisfactory for drying alcohol, particularly when the bentonite is extruded in the plastic state in an auger extrusion machine, such as is shown in U. S. Patent 2,079,854 to Hartshorne, and thereafter dried, ground and screened to desired particle size, and preferably calcined at 400° F. to 900° F. The method of the present invention is applicable to the treatment of alcohols of relatively high concentration, i. e., of the order of 85% or hgiher, and particularly to the production of anhydrous or substantially anhydrous alcohol from 95% alcohol. It is to be understood, of course, that the primary object of the invention is to produce absolute alcohol by limiting the space velocity during contacting to 0.1 or less. However, a substantial degree of drying can be effected by operating at a space velocity not in excess of 0.2. For example, alcohol of 99% to 99.5% concentration may be obtained from 95% alcohol by contacting with the adsorbent at a space velocity of 0.2 at temperatures of the order of 70° F. to 80° F. Operating at space velocities in excess of about 0.2 in the liquid phase does not give sufficient drying to be of commercial interest.

In carrying out my drying process, granular activated adsorbent is disposed in a suitable vessel or tower and the alcohol to be dried is supplied to the top of the adsorbent bed and is permitted to percolate downwardly therethrough at a space velocity of not more than 0.2, and preferably 0.1 or less, the temperature being such that the alcohol remains in the liquid phase. Temperatures above the freezing point of the alcohol but not in excess of about 100° F. may be used, a temperature between 70° F. and 80° F. being quite suitable. If it is desired to produce absolute alcohol, for example, from 95% ethyl alcohol, the rate of flow or space velocity is maintained below 0.1, the effluent from the adsorbent bed being tested periodically (determination of specific gravity), and the percolation stopped when the alcohol effluent shows traces of water. The absolute alcohol thus produced may be segregated, and the percolation then continued to give alcohol fractions of progressively increasing water content. For example, alcohol fractions having concentrations of 99%, 98%, 97%, and 96% may be produced. At such time as the adsorbent becomes spent, i. e., the concentration of the alcohol effluent is the same as that of the alcohol charged, the operation is terminated, and the adsorbent is regenerated. This may be accomplished by various methods. For example, the adsorbent bed may be steamed or flushed with water to remove entrained or adsorbed alcohol, and thereafter dried by heating at temperatures up to 500° F. or 600° F., preferably with the passage of air or inert gas therethrough. Or, the spent adsorbent may be subjected to reduced pressure to effect removal of the alcohol by vaporization, followed by steaming and drying, or drying without steaming. At such time as the adsorbent no longer responds to the above methods of regeneration, it may be steamed and then calcined at temperatures between 700° F. and 1200° F. to remove adsorbed carbonaceous impurities.

In order to operate in a continuous manner in producing substantially anhydrous alcohol from alcohol, of for example, 95% concentration, a plurality of adsorbent drying towers may be employed. The 95% alcohol is percolated through the adsorbent in the first tower until absolute alcohol is no longer obtained. The effluent from the first tower, containing less water than the alcohol charged, is then percolated through fresh adsorbent in a second tower until absolute alcohol is no longer obtained, at which time the effluent from the second tower is introduced to fresh adsorbent in a third tower. Meanwhile, the adsorbent in the first tower may have become spent, i. e., saturated with water, and is therefore in condition for regeneration. After regeneration, the water-containing effluent from the third tower may be charged to the first tower. By progressively changing the flow of alcohol to the towers, and regenerating as necessary, the ultimate degree of water adsorption is effected in each of the towers in the series, consequently increased yields of absolute alcohol per unit weight of adsorbent are obtained with this type of multiple tower operation.

My invention may be further illustrated by the following examples, which however are not to be construed as limiting the scope thereof.

Granular bauxite of 10–30 mesh was activated by calcining at 700° F. and 1200° F., respectively, to give two bauxite adsorbents having volatile matter contents (mostly water) of 7% and 1.5% by weight, respectively. Fuller's earth of 10–30 mesh was activated by calcining at 650° F. to a volatile matter content of 6% by weight. An acid activated bentonite known as "Filtrol" was granulated to 10–30 mesh and activated by calcining at 900° F. to a volatile matter content of 4% by weight.

These activated adsorbents were placed in separate towers and ethyl alcohol of various concentrations was percolated through the adsorbents at a temperature of 75° F. The results are shown in the following table.

| Adsorbent | Act. Temp., °F. | Conc. Alcohol Charge | Space Velocity | Cc. Absolute Alcohol per 100 gm. Adsorbent | Wt. of Water Adsorbed |
|---|---|---|---|---|---|
| Bauxite | 700 | 87.9 | .03 | 14.0 | 1.5 |
|  | 1,200 | 93.9 | .03 | 30.0 | 1.6 |
|  | 700 | 95.0 | .05 | 28.5 | 1.5 |
|  | 1,200 | 95.0 | .05 | 30.4 | 1.6 |
|  | 1,200 | 96.0 | .03 | 60.0 |  |
|  | 1,200 | 98.0 | .03 | 80.7 |  |
| Fuller's Earth | 650 | 95.0 | .03 | 47.4 | 2.5 |
|  | 650 | 95.6 | .05 | 68.6 | 2.5 |
|  | 650 | 96.0 | .03 | 71.7 |  |
|  | 650 | 98.0 | .03 | 120.6 |  |
| Filtrol | 900 | 96.5 | .03 | 22.0 | 1.5 |

The results shown in the following table were obtained using ethyl alcohol as charge, bauxite activated at 1200° F. and fuller's earth at 650° F. as adsorbents, a percolation temperature of 78° F., and a space velocity of .03. The percentage yields of alcohol fractions of various concentrations is given.

| Product Per Cent Conc. Alcohol | Cc. Alcohol Product per 100 gm. Adsorbent | |
|---|---|---|
|  | Bauxite Charge Alcohol 95.2% | Fuller's Earth Charge Alcohol 96% |
| 100% | 26.5 | 71.7 |
| 99.9%–99.0% | 10.0 | 18.6 |
| 98.9%–98.0% | 4.0 | 6.3 |
| 97.9%–97.0% | 24.0 | 39.4 |
| 96.9%–96% | 23.8 | 84.5 |
| 95.9%–95.2% | 6.2 |  |

From the results given in the above examples, it is evident that substantial yields of absolute alcohol, as well as alcohol fractions of high concentration, may be obtained when operating in accordance with the present invention, wherein the drying is effected in the liquid phase and under controlled space velocities of less than 0.2 volumes of charge per volume of adsorbent per hour.

I claim:

1. A method for drying alcohol containing water, which comprises intimately contacting said alcohol at a temperature above its freezing point but below 100° F. with an argillaceous adsorbent which has been thermally activated between 400° F. and 1200° F., at a space velocity of not more than 0.2 volume of alcohol per volume of adsorbent per hour.

2. A method for producing absolute alcohol from alcohol containing water, which comprises intimately contacting said alcohol containing water, at a temperature above its freezing point but below 100° F., with an argillaceous adsorbent which has been thermally activated between 400° F. and 1200° F., at a space velocity of not more than 0.1 volume of alcohol per volume of adsorbent per hour.

3. A method for producing absolute ethyl alcohol from ethyl alcohol containing water, which comprises passing said ethyl alcohol containing water, at a temperature above its freezing point but below 100° F., through a mass of an argillaceous adsorbent which has been thermally activated between 400° F. and 1200° F., at a space velocity of not more than 0.1 volume of alcohol per volume of adsorbent per hour, and terminating the passage of said alcohol containing water when the effluent from said adsorbent contains water.

4. A method for drying alcohol containing water, which comprises intimately contacting said alcohol at a temperature above its freezing point but below 100° F. with bauxite which has been thermally activated between 600° F. and 1200° F., at a space velocity of not more than 0.2 volume of alcohol per volume of bauxite per hour.

5. A method for drying alcohol containing water, which comprises intimately contacting said alcohol at a temperature above its freezing point but below 100° F. with fuller's earth which has been thermally activated between 450° F. and 900° F., at a space velocity of not more than 0.2 volume of alcohol per volume of fuller's earth per hour.

6. A method for drying alcohol containing water, which comprises intimately contacting said alcohol at a temperature above its freezing point but below 100° F. with acid activated bentonite which has been thermally activated between 400° F. and 900° F., at a space velocity of not more than 0.2 volume of alcohol per volume of acid activated bentonite per hour.

WILLIAM S. W. McCARTER.

REFERENCES CITED

The following references are of record in the file of this patent:

UNITED STATES PATENTS

| Number | Name | Date |
|---|---|---|
| 2,137,605 | Derr | Nov. 22, 1938 |
| 2,203,690 | Malm et al. | June 11, 1940 |
| 2,253,755 | Brant | Aug. 26, 1941 |
| 2,261,918 | Pittman et al. | Nov. 4, 1941 |
| 2,261,923 | Pittman et al. | Nov. 4, 1941 |
| 2,305,657 | Aehnelt | Dec. 22, 1942 |
| 2,323,524 | Downs, Jr. | July 6, 1943 |
| 2,388,616 | La Laude, Jr. | Nov. 6, 1945 |